United States Patent
Rikiso et al.

(10) Patent No.: US 12,249,832 B2
(45) Date of Patent: Mar. 11, 2025

(54) POWER CONVERTER, METHOD OF CONTROLLING POWER CONVERTER, AND COMPUTER READABLE RECORDING MEDIUM

(71) Applicant: FURUKAWA ELECTRIC CO., LTD., Tokyo (JP)

(72) Inventors: Masahiro Rikiso, Tokyo (JP); Asuka Abe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 9 days.

(21) Appl. No.: 18/157,332

(22) Filed: Jan. 20, 2023

(65) Prior Publication Data

US 2023/0155380 A1 May 18, 2023

Related U.S. Application Data

(63) Continuation of application No. PCT/JP2021/027723, filed on Jul. 27, 2021.

(30) Foreign Application Priority Data

Aug. 6, 2020 (JP) ................................. 2020-134040
Oct. 30, 2020 (JP) ................................. 2020-182775

(51) Int. Cl.
*H02J 3/00* (2006.01)
*B60L 50/60* (2019.01)
(Continued)

(52) U.S. Cl.
CPC .......... *H02J 3/00125* (2020.01); *B60L 50/60* (2019.02); *B60L 53/20* (2019.02); *H02J 3/12* (2013.01);
(Continued)

(58) Field of Classification Search
CPC .......... H02J 3/00125; H02J 3/12; H02J 3/381; H02J 2207/20; H02J 2300/24;
(Continued)

(56) References Cited

U.S. PATENT DOCUMENTS 11,133,673 B2    9/2021  Yamashita et al.
2020/0280183 A1*  9/2020  Yamashita ................ H02J 7/35

FOREIGN PATENT DOCUMENTS

AU    2018373453 A1    6/2020
EP     3 823 152 A1    5/2021
(Continued)

OTHER PUBLICATIONS

International Search Report issued Oct. 12, 2021 in PCT/JP2021/027723 filed on Jul. 27, 2021 2 pages.
(Continued)

*Primary Examiner* — Lincoln D Donovan
*Assistant Examiner* — Alex W Lam
(74) *Attorney, Agent, or Firm* — Oblon, McClelland, Maier & Neustadt, L.L.P.

(57) ABSTRACT

A power converter includes: an input unit configured to be electrically connected to a device; a voltage charge unit configured to change voltage; a voltage adjustment unit configured to adjust the voltage supplied to a transmission line; a target setting unit configured to set a first target value of the voltage change unit; a voltage monitoring unit configured to observe the voltage of the transmission line; and a threshold determination mechanism configured to calculate a second target value of the voltage adjustment unit in accordance with voltage of the transmission line. The target setting unit of the power converter is configured to generate the first target value as an output target of the voltage charge unit in accordance with the voltage observed by the voltage monitoring unit. The first target value has characteristics to (Continued)

change a threshold voltage for controlling output of the voltage adjustment unit depending on time.

13 Claims, 8 Drawing Sheets

(51) Int. Cl.
*B60L 53/20* (2019.01)
*H02J 3/12* (2006.01)
*H02J 3/38* (2006.01)

(52) U.S. Cl.
CPC ............ *H02J 3/381* (2013.01); *B60L 2210/10* (2013.01); *B60L 2210/30* (2013.01); *H02J 2207/20* (2020.01); *H02J 2300/24* (2020.01); *H02J 2300/30* (2020.01)

(58) Field of Classification Search
CPC ............. H02J 2300/30; H02J 13/00002; H02J 13/00018; H02J 13/00028; H02J 2203/10; H02J 2310/48; H02J 3/322; H02J 3/32; B60L 50/60; B60L 53/20; B60L 2210/10; B60L 2210/30; B60L 53/11; B60L 53/30; B60L 53/53; B60L 53/51; Y02E 70/30; Y02T 10/70; Y02T 10/7072

See application file for complete search history.

(56) References Cited

FOREIGN PATENT DOCUMENTS

| | | |
|---|---|---|
| JP | 5-244717 A | 9/1993 |
| JP | 2011-78237 A | 4/2011 |
| JP | 2020-14370 A | 1/2020 |
| WO | WO 2019/103059 A1 | 5/2019 |

OTHER PUBLICATIONS

Extended European Search Report issued Jul. 4, 2024, in corresponding European Patent Application No. 21854290.0, 9 pages.

* cited by examiner

POWER CONVERTER, METHOD OF CONTROLLING POWER CONVERTER, AND COMPUTER READABLE RECORDING MEDIUM

This application is a continuation of International Application No. PCT/JP2021/027723, filed on Jul. 27, 2021 which claims the benefit of priority of the prior Japanese Patent Application No. 2020-134040, filed on Aug. 6, 2020 and Japanese Patent Application No. 2020-182775, filed on Oct. 30, 2020, the entire contents of which are incorporated herein by reference.

BACKGROUND

The present disclosure relates to a power converter and a power system that includes the power converter, where the power converter is electrically connected to an alternating-current commercial power system via a transmission line for transmitting electric power, is electrically connected to a device capable of inputting electric power from the transmission line and/or outputting electric power to the transmission line, and has a function to control the device on the basis of a reference function for generating a target value when performing autonomous control on the device in accordance with voltage that is observed by the power converter.

In recent years, a power network using locally produced and consumed electric power is attracting attention as an alternative method for a large-scale power network that is dependent on fossil energy or nuclear energy. Various kinds of devices, such as a photovoltaic device (PV) as a power generator that generates electric power by using renewable energy, a stationary power storage device, and an electric vehicle (EV) charger for charging an EV, are connected to the power network using the locally produced and consumed electric power. Each of the devices as described above adopts a direct-current power supply, and therefore, examination is being made to construct a power network (direct-current (DC) grid) that uses a DC and that includes a power converter.

As a method of controlling a DC grid, a power converter that is connected to a photovoltaic device (PV), a stationary power storage device, or the like performs constant current control or constant voltage control on the photovoltaic device (PV), the stationary power storage device, or the like on the basis of an instruction that is issued by a central control unit, in order to centrally control electric energy of a DC bus of the DC.

Furthermore, droop control is performed by giving a reference function based on local electric power (P) and local voltage (V) to the photovoltaic device (PV), the stationary power storage device, or the like such that the reference function causes the photovoltaic device (PV), the stationary power storage device, or the like to have droop characteristics with respect to a target voltage value in accordance with electric energy that is needed for the DC bus. The droop control is control of adding virtual impedance to devices that are electrically connected to power converters by performing control such that a relationship between output electric power or output electric current and output voltage has droop characteristics, in order to realize load sharing among the power converters. The photovoltaic device (PV), the stationary power storage device, or the like is controlled in an autonomous-decentralized manner by the droop control, so that adjustment of an amount of output from the photovoltaic device (PV) or an amount of input and output of the stationary power storage device is optimized in accordance with electric energy that is needed for the DC bus, and voltage of the DC bus is stabilized.

As the known droop control, for example, to stabilize the voltage of the DC bus and stabilize a charge status of the stationary power storage device, the reference function may be updated to shift an intercept (voltage (V) of the entire DC grid) of the reference function with the droop characteristics to a high-voltage side or a low-voltage side in accordance with a change in a changing rate of the stationary power storage device. Examples of the reference function that is updated as described above include a reference function in which an input/output constant zone in which a target input/output of the power storage device is maintained at 0 over a predetermined voltage range (International Publication Pamphlet No. 2019/103059).

SUMMARY

In the central control method on the DC grid, it is possible to easily control the entire DC grid, but it is difficult to smoothly cope with sudden fluctuation of power supply and demand, which is a problem. In Patent Literature 1, the input/output constant zone in which input and output are zero is provided in the reference function, so that when the DC grid operates normally, it is possible to cover a power supply amount of the DC grid by electric power that is supplied from an external commercial power system or an external photovoltaic device (PV) without performing charging or discharging of the power storage device.

In contrast, for example, to cover at least a part of the power supply amount of the DC grid by the electric power that is supplied from the photovoltaic device (PV), a reference function for suppressing output (electric power) P of the photovoltaic device (PV) when voltage V of the DC bus increases to a threshold V_thresh as illustrated in FIG. 6 may be adopted as a reference function for controlling the output of the photovoltaic device (PV). The reference function illustrated in FIG. 6 stabilizes the voltage of the DC bus by suppressing the output (electric power) P of the photovoltaic device (PV) with an increase in the voltage V of the DC bus.

However, to suppress power supply from the external commercial power system, if power efficiency of the photovoltaic device (PV) is improved by setting the threshold V_thresh of the reference function illustrated in FIG. 6 to a relatively high value, it may become difficult to stabilize the voltage of the DC bus when disturbance occurs due to load fluctuation or the like. In contrast, to stabilize the voltage of the DC bus even when disturbance occurs due to load fluctuation or the like, if the threshold V_thresh of the reference function illustrated in FIG. 6 is set to a relatively low value, output suppression is likely to occur in the photovoltaic device (PV) and it becomes difficult to improve the power efficiency of the photovoltaic device (PV), which is a problem.

There is a need for a power converter that is able to stabilize voltage of a transmission line even when disturbance occurs in a power network and improve power efficiency of a device included in the power network, a power system including the power converter, a method of controlling the power converter, a method of controlling the power system, and a program.

According to one aspect of the present disclosure, there is provided a power converter for being connected to a transmission line, the power converter including: an input unit configured to be electrically connected to a device that is able to input electric power from the transmission line and/or output electric power to the transmission line; a voltage charge unit connected to the input unit and configured to change voltage; a voltage adjustment unit connected to the voltage change unit and configured to adjust the voltage supplied to the transmission line; a target setting unit configured to set a first target value of the voltage change unit; a voltage monitoring unit connected to the transmission line and configured to observe the voltage of the transmission line; and a threshold determination mechanism connected to the voltage monitoring unit and configured to calculate a second target value of the voltage adjustment unit in accordance with voltage of the transmission line, wherein the target setting unit of the power converter is configured to generate the first target value as an output target of the voltage charge unit in accordance with the voltage observed by the voltage monitoring unit, and the first target value has characteristics to change a threshold voltage for controlling output of the voltage adjustment unit depending on time.

DETAILED DESCRIPTION

Figure 1:
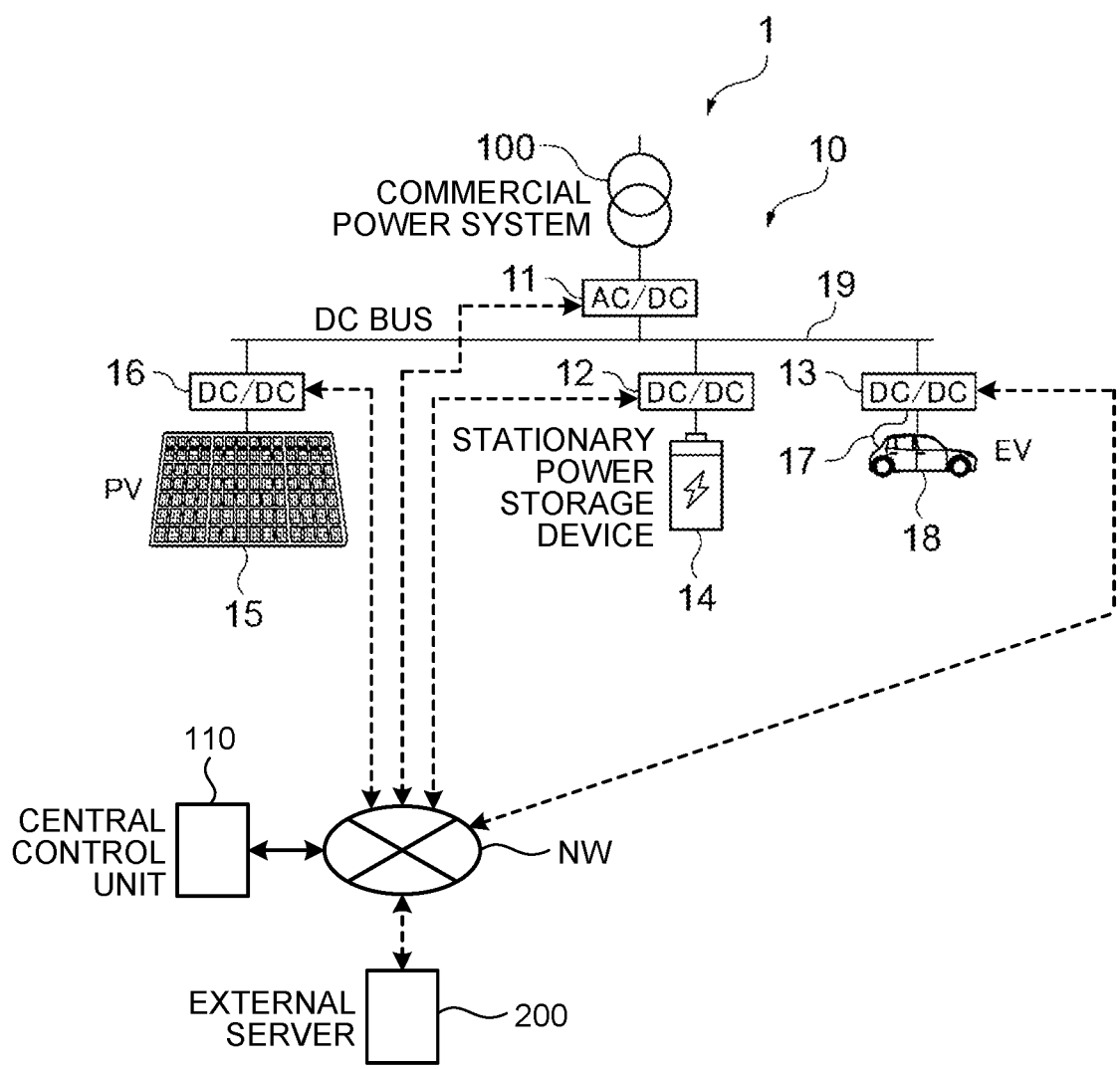
FIG. 1 is an explanatory diagram illustrating an outline of an entire power network that constitutes a power system including a power converter according to an embodiment.
Figure 2:
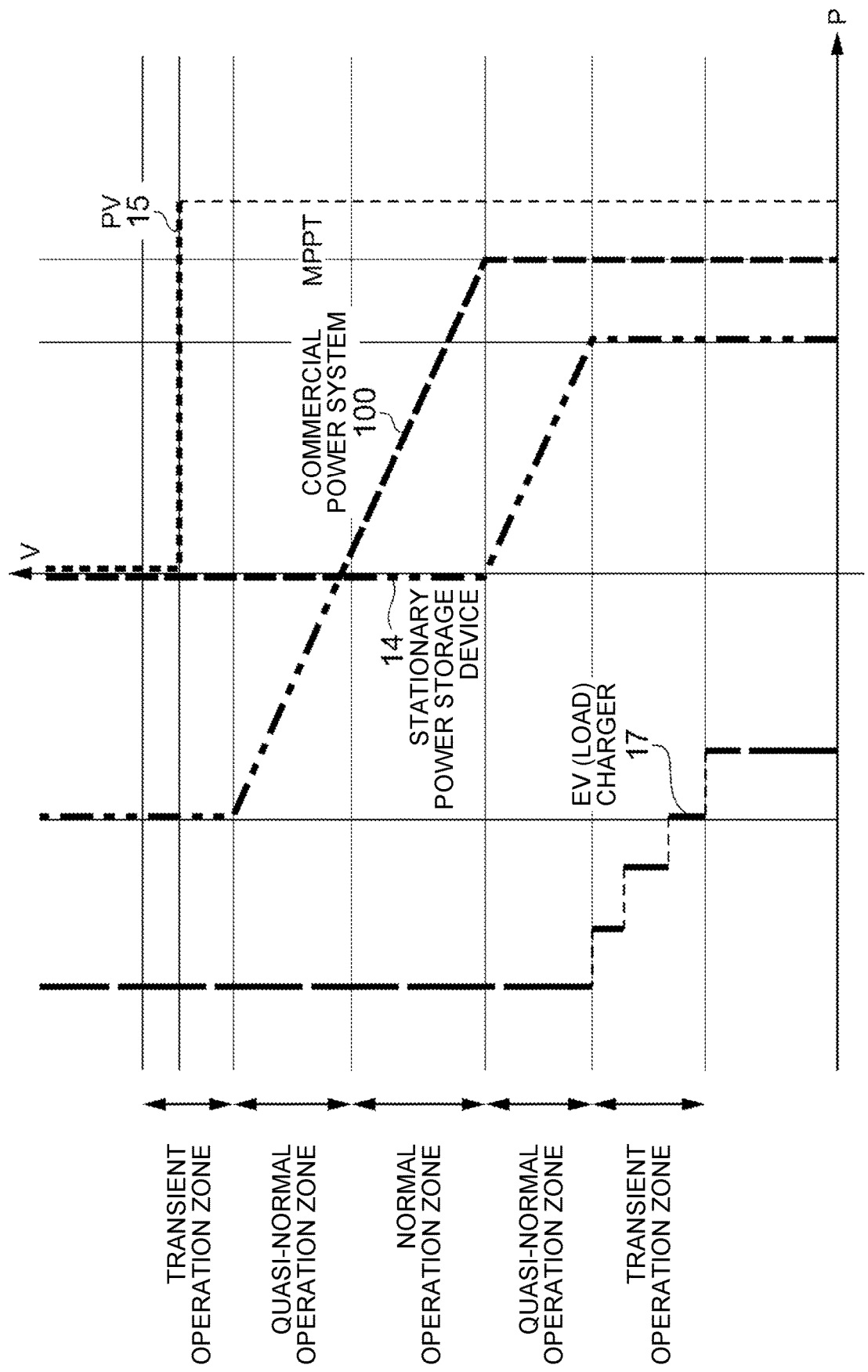
FIG. 2 is an explanatory diagram of a reference function that is given to a device used in the power network that constitutes the power system including the power converter according to the embodiment.
Figure 3:
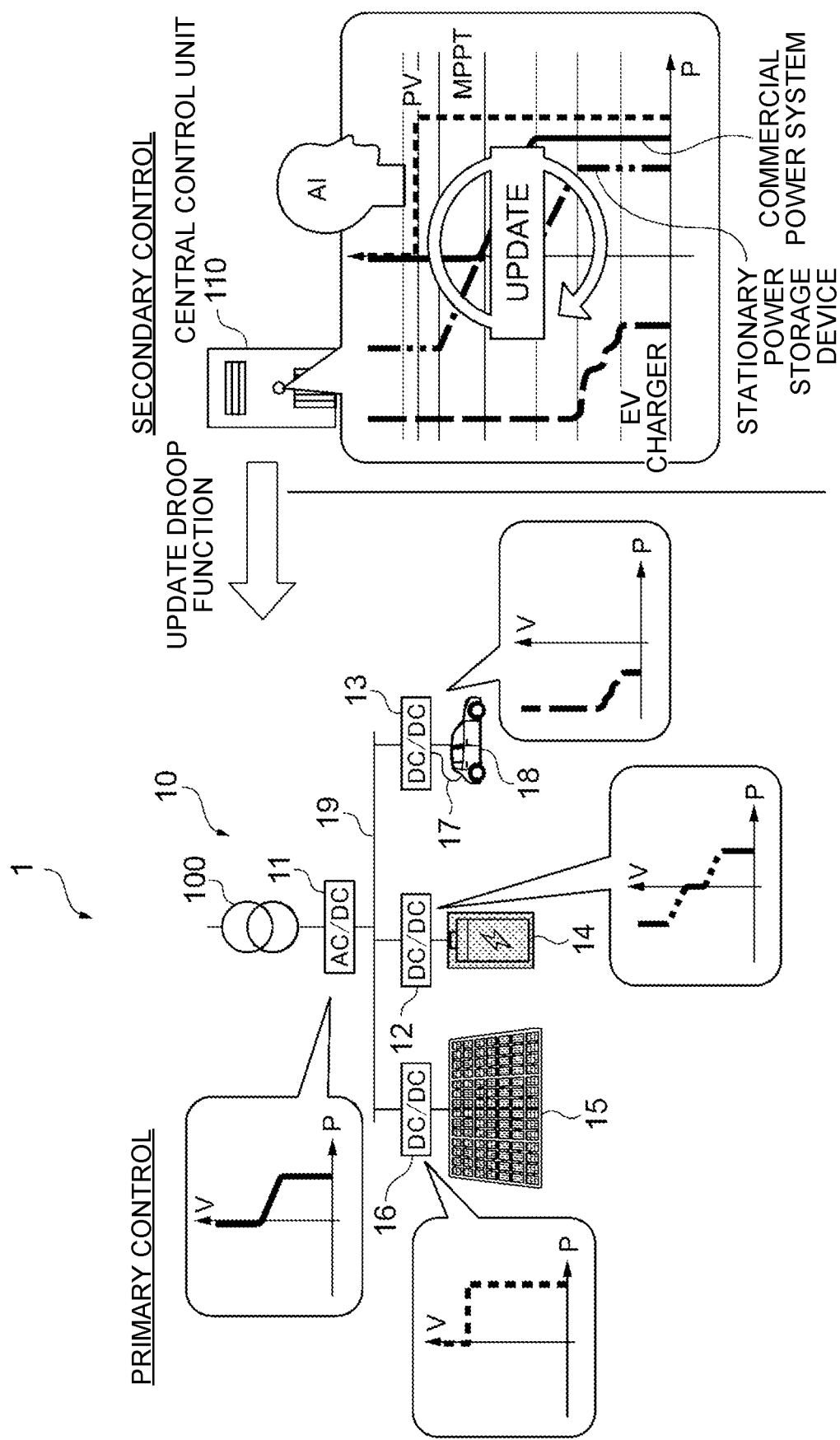
FIG. 3 is an explanatory diagram illustrating how the reference function that is given to the device used in the power system including the power converter is updated.
Figure 4:
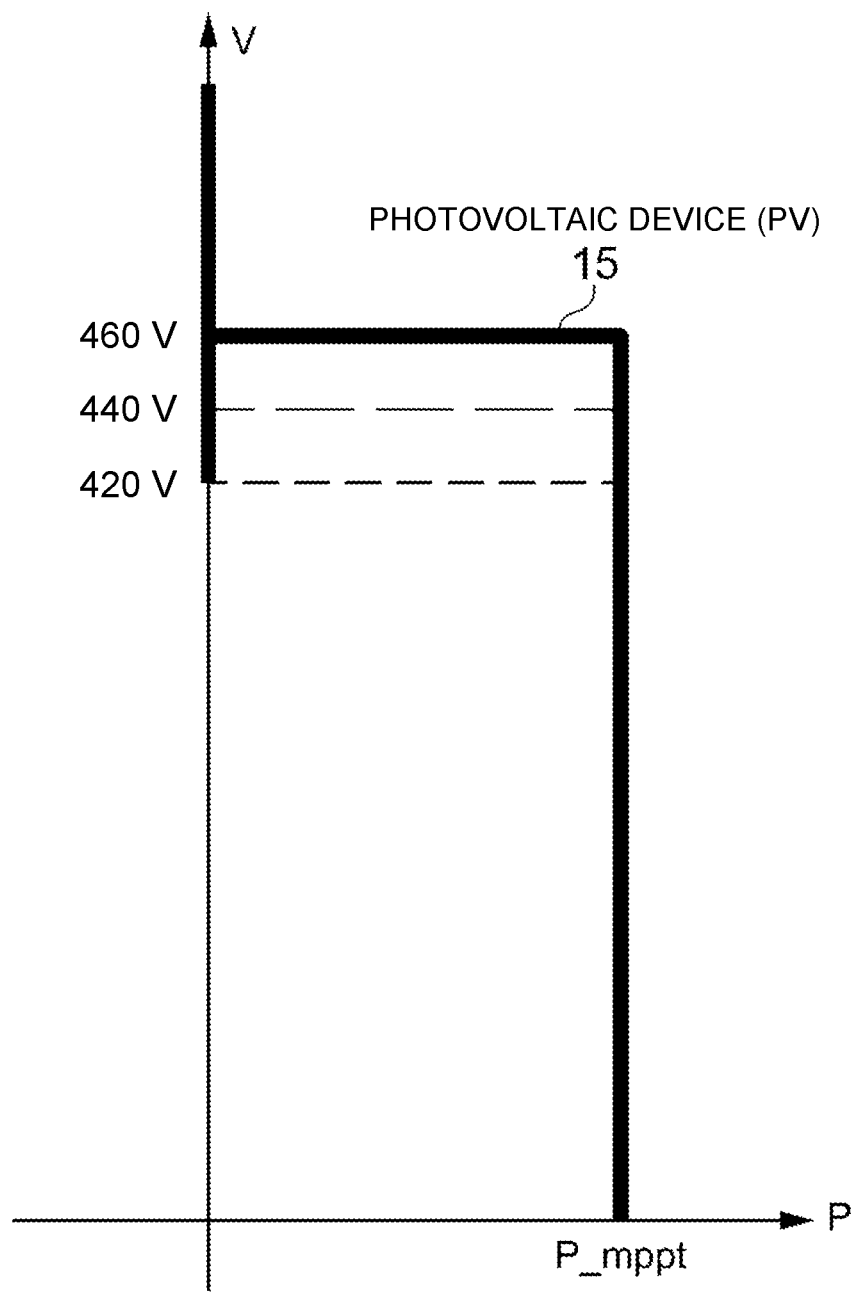
FIG. 4 illustrates an example of a reference function that has time limit characteristics and that is given to a photovoltaic device (PV) used in the power system including the power converter.
Figure 5:
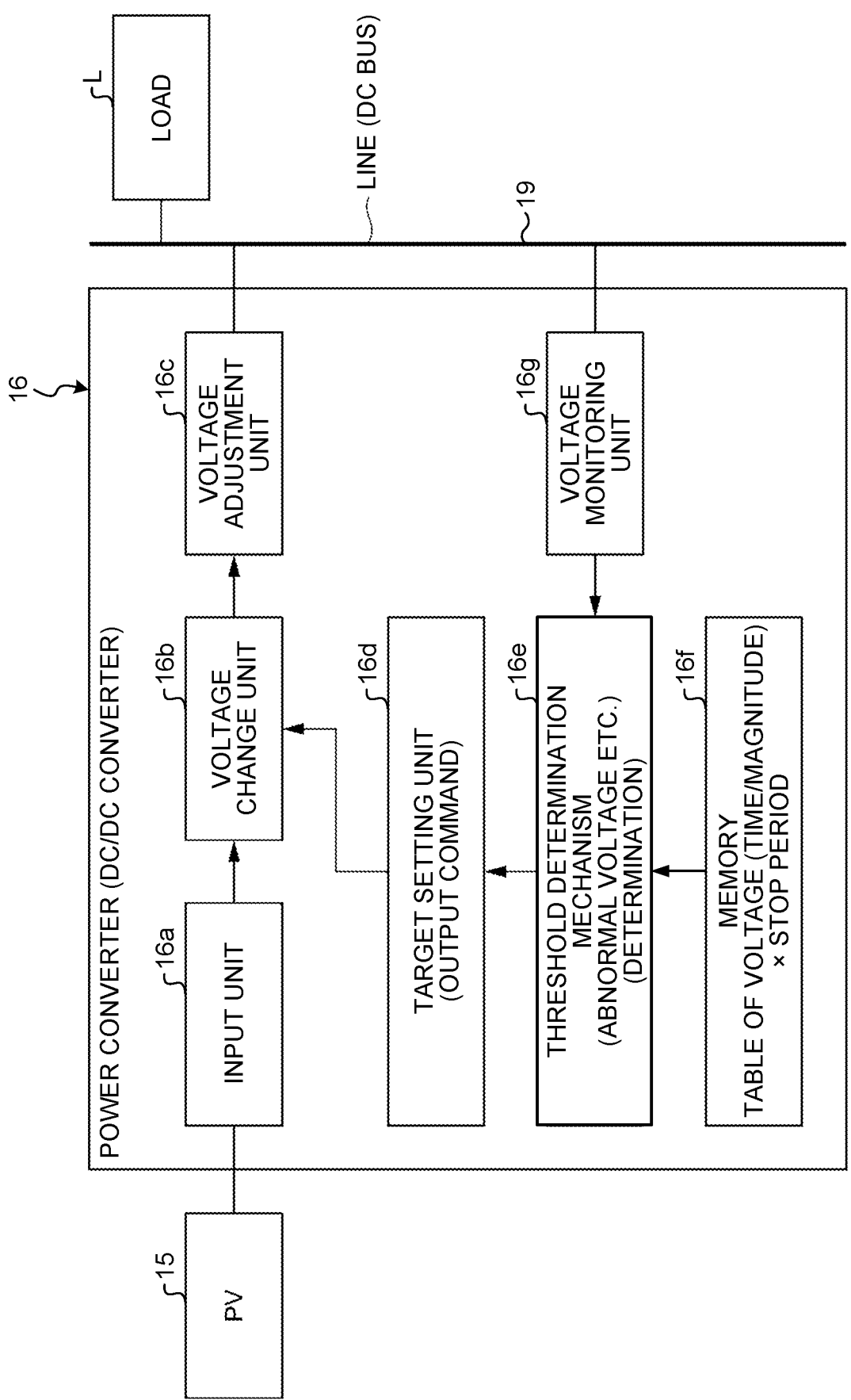
FIG. 5 is a block diagram illustrating a configuration example of the power converter according to the present disclosure.
Figure 6:
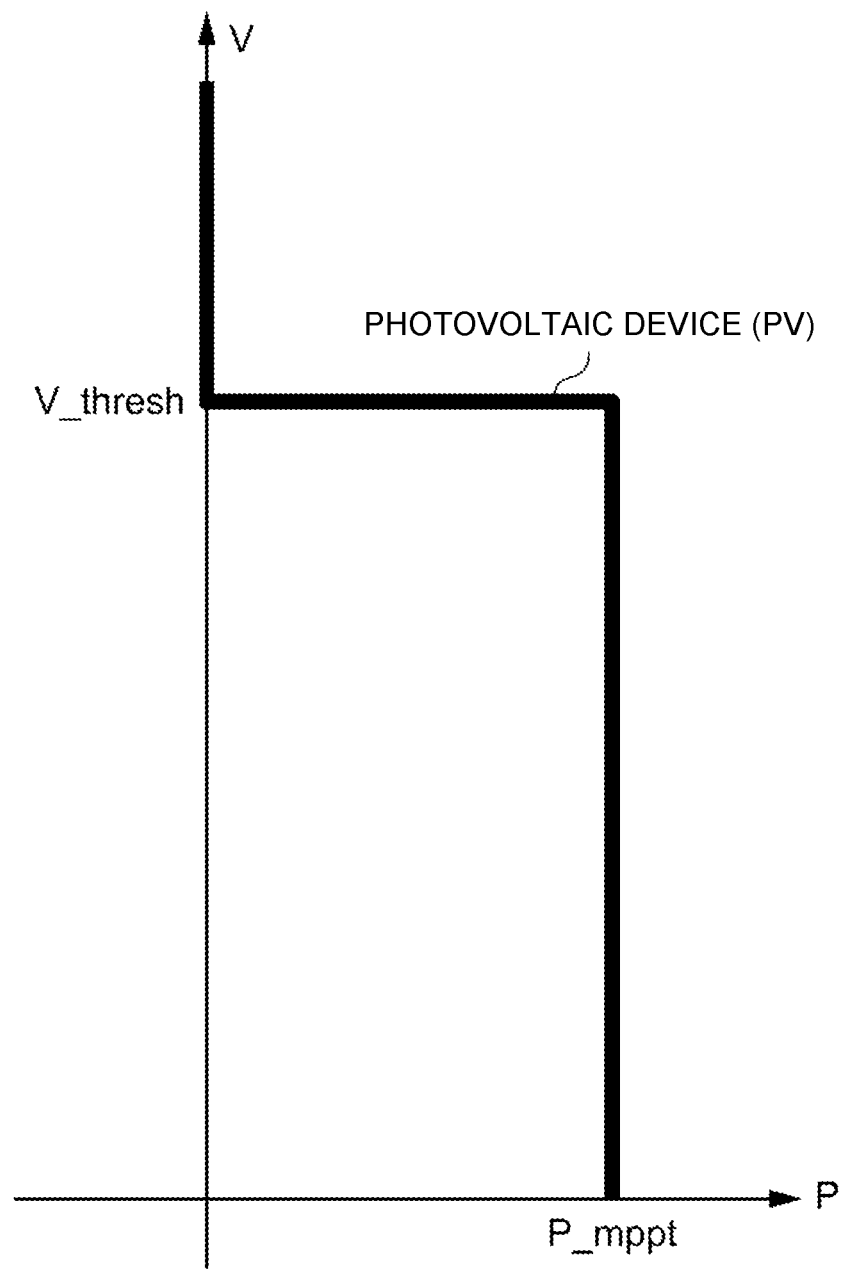
FIG. 6 illustrates a known reference function that has time limit characteristics and that is given to a photovoltaic device (PV) used in the power system including the power converter.
Figure 7:
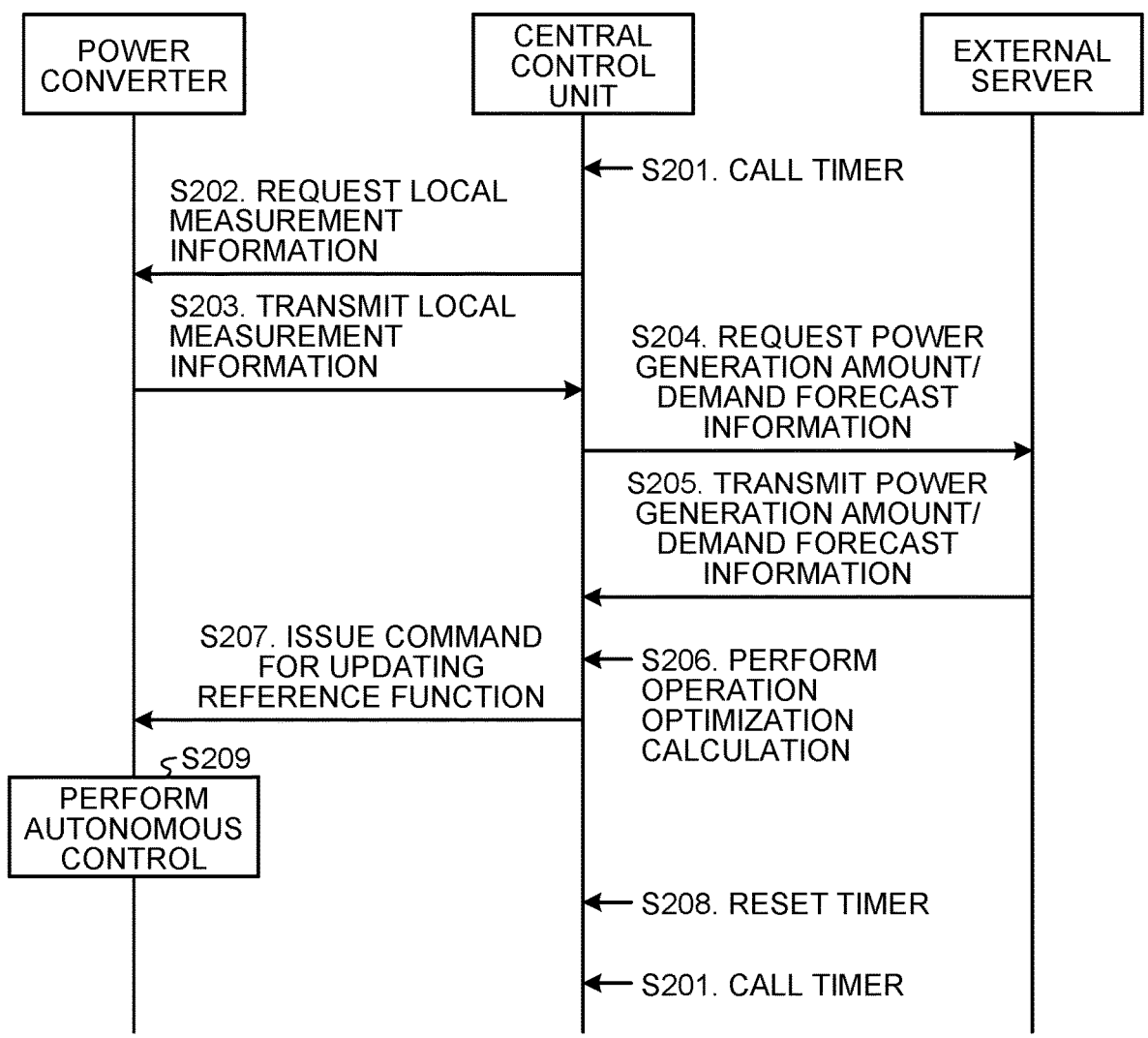
FIG. 7 is a sequence diagram illustrating an example of a method of controlling the power system.

A power system including a power converter according to an embodiment will be described below. FIG. 1 is an explanatory diagram illustrating an outline of an entire power network that constitutes a power system including the power converter. FIG. 2 is an explanatory diagram of a reference function that is given to a device used in the power network that constitutes the power system including the power converter. FIG. 3 is an explanatory diagram illustrating how the reference function that is given to the device used in the power system including the power converter is updated. FIG. 4 illustrates an example of a reference function that has time limit characteristics and that is given to a photovoltaic device (PV) used in the power system including the power converter. FIG. 5 is a block diagram illustrating a configuration example of the power converter according to the present disclosure. FIG. 7 is a sequence diagram illustrating an example of a method of controlling the power system.

Meanwhile, in the present specification, the "time limit characteristics" of the reference function that has the time limit characteristics are characteristics that, when abnormal voltage that has a large impact on stabilization of voltage of a transmission line to which a device is electrically connected is observed, and if the abnormal voltage is continued for a short period of time, input and output electric power and an electric current are stopped, and, when abnormal voltage that has a small impact on the stabilization of the voltage of the transmission line is observed, and if the abnormal voltage is continued for a certain period of time, input and output electric power and an electric current are stopped. Meanwhile, in the present specification, the transmission line may be simply described as a line.

As illustrated in FIG. 1, a power system 1 that is formed in a power network 10 including a power converter according to an embodiment includes a power converter that is electrically connected to an alternating-current commercial power system 100 via a line (a DC bus 19) and that is electrically connected to a device capable of inputting electric power from the line (the DC bus 19) and/or outputting electric power to the line (the DC bus 19). In other words, in the power system 1, a power element is provided that includes the power converter, which is electrically connected to the alternating-current commercial power system 100 via the line (the DC bus 19), and the device, which is electrically connected to the power converter and able to input electric power from the line (the DC bus 19) via the power converter and/or output electric power to the line (the DC bus 19).

Specifically, provided are an AC/DC converter 11 that is connectable to the alternating-current commercial power system 100, that converts alternating-current power input from the alternating-current commercial power system 100 to direct-current power, and that outputs the direct-current power, the DC bus 19 that is connected to an output of the AC/DC converter 11, a first DC/DC converter 13 that is connected to the DC bus 19, that converts direct-current power input from the DC bus 19 to charging voltage of a storage battery that is a charging target, and that outputs the charging voltage, a charger (an EV charger 17 in the power network 10) that is connected to the first DC/DC converter 13 and that is connectable to the storage battery as the charging target, a bidirectional DC/DC converter 12 that is connected to the DC bus 19, that converts the direct-current power input from the DC bus 19 to charging voltage of a stationary power storage device 14, and that outputs the charging voltage, and a photovoltaic device (PV) 15 as a power generator that is connected to the DC bus 19 via a second DC/DC converter 16 and that generate power by using renewable energy.

Based on the description as above, the power network 10 that constitutes the power system 1 is a DC grid that is a direct-current power grid. In the power network 10, the storage battery is an in-vehicle battery that is mounted on an electric vehicle (EV) 18 as a load, for example. An output of the DC bus 19 is connected to the EV charger 17 and the in-vehicle battery of the electric vehicle 18 is connected to the EV charger 17, so that the in-vehicle battery is charged. The stationary power storage device 14 is an in-facility power storage device of the power network 10.

Each of the power converters includes, as one example, a power conversion unit, a sensor, a control unit, and a communication unit.

The power conversion unit is a part that has a power conversion function, such as AC/DC conversion or DC/DC conversion, in each of the power converters, and is configured with an electric circuit including a coil, a condenser, a diode, a switching element, or the like, for example. The switching element is, for example, a field-effect capacitor or an insulated-gate bipolar transistor. The power conversion unit is able to control power conversion characteristics by, for example, pulse width modulation (PWM) control.

The sensor is used to observe an electrical property, such as an electric current, voltage, or electric power, in each of the power converters. The sensor outputs a value of the observed electrical property (an electric current value, a voltage value, a power value, or the like) as an observed value to the control unit.

In the power system 1 including the power network 10, the control unit controls an amount of power received from the commercial power system 100. Further, the control unit controls charging and discharging of the stationary power storage device 14, discharging of the photovoltaic device 15, and charging of the in-vehicle battery of the electric vehicle 18 that is connected to the EV charger 17.

Each of the control units includes a processor that performs various kinds of arithmetic processing for controlling the power conversion function and a storage unit. Examples of the processor include a central processing unit (CPU), an application specific integrated circuit (ASIC), a field-programmable gate array (FPGA), a digital signal processor (DSP), and a graphics processing unit (GPU). The storage unit includes, for example, a read only memory (ROM) that stores therein various kinds of programs, data, and the like that are used by the processor to perform arithmetic processing. Further, the storage unit includes, for example, a random access memory (RAM) that is used as an operating space by the processor to perform arithmetic processing or that is used to store a result of the arithmetic processing performed by the processor. The storage unit may include an auxiliary storage device, such as a hard disk drive (HDD) or a solid state drive (SSD). Functions of each of the control units are implemented as functional units by causing the processor to read various kinds of programs from the storage unit and execute the various kinds of programs. For example, each of the control units outputs a pulse width modulation (PWM) signal including information on a manipulated variable (for example, a duty ratio) for PWM to the power conversion unit, and performs PWM control on each of the power converters. Meanwhile, each of the control units may directly output the manipulated variable to the power conversion unit or may output the manipulated variable to the power conversion unit via a different functional unit (for example, a loop control unit) (not illustrated).

The communication unit includes a communication module that performs telecommunication in a wired or wireless manner, and a communication control unit that controls operation of the communication module. The communication unit performs telecommunication with a central control unit 110, which is a central control device (to be described later), via a network NW that includes an Internet network, a mobile phone network, or the like. The communication unit receives a command from the central control unit 110 and outputs the command to the control unit, for example. The communication unit transmits information on a power situation input from the control unit to the central control unit 110, for example. Meanwhile, if the information on the power situation is an observed value of the sensor, the communication unit may transmit the observed value input form the sensor to the central control unit 110, for example.

An example of the central control unit 110 will be described. The central control unit 110 includes a control unit, a storage unit, and a communication unit. As a configurations of each of the control unit, the storage unit, and the communication unit, the same configuration as that of each of the control unit, the storage unit, and the communication unit of the power converter illustrated by example may be adopted.

Functions of the control unit are implemented as functional units by causing the control unit to read various kinds of programs from the storage unit and execute the various kinds of programs.

The communication unit performs telecommunication with each of the power converters and an external server 200 via the network NW.

Meanwhile, the external server 200 is a server that is provided outside the power system 1. The external server 200 may be an information processing apparatus that is configured to function as an energy management system (EMS) in a different power system or an information processing apparatus that includes a database and functions as a data server for the central control unit 110, for example. The external server 200 stores therein various kinds of information that may affect operation of the power system 1.

In the power system 1, the second DC/DC converter 16 has a function to perform control so as to follow a reference function that is a control objective function of generating a target value when performing autonomous control on the photovoltaic device (PV) 15 in accordance with local voltage (V) that is observed by the second DC/DC converter 16, in other words, a function to control output of the photovoltaic device (PV) 15 on the basis of the reference function.

The second DC/DC converter 16 that is connected to the photovoltaic device (PV) 15 has a function to control operation of the photovoltaic device (PV) 15 such that a relationship between the local voltage (V) and local electric power (P), in other words, the local voltage (V) and the electric power (P) output from the photovoltaic device (PV) 15, follows a predetermined reference function. In other words, the second DC/DC converter 16 performs control such that the relationship between the local voltage (V) and the local electric power (P) maintains the predetermined reference function in a predetermined control cycle.

As a specific example, as illustrated in FIG. 2, the second DC/DC converter 16 that is connected to the photovoltaic device (PV) 15 performs output control on the photovoltaic device (PV) 15 (in FIG. 2, there is no output from the photovoltaic device (PV) 15, in other words, the electric power (P)=0) if the power network 10 is in a transient operation zone in which a demand for electric power is low (in FIG. 2, a transient operation zone in an upper part in which a value of the voltage (V) is high), and performs maximum power point tracking (MPPT) on the photovoltaic device (PV) 15 in other operation zones. Therefore, in FIG. 2, the output control on the photovoltaic device (PV) 15 is not the droop control.

Further, in the power system 1, the power converters other than the second DC/DC converter 16 have functions to control operation of devices so as to follow reference functions of generating target values when performing autonomous control on the devices connected to the other power converters, in accordance with local values that are observed by the other power converters.

In the power system 1, the AC/DC converter 11 that converts alternating-current power input from the alternating-current commercial power system 100 to direct-current power and outputs the direct-current power has a function to perform droop control such that a relationship between the local voltage (V) and the local electric power (P), in other words, a relationship between the local voltage (V) and the electric power (P) output to the DC bus 19, has predetermined droop (dropping) characteristics. In other words, the AC/DC converter 11 has a function to perform droop control on input and output of the commercial power system 100 such that the relationship between the local voltage (V) and the electric power (P) that is input to and output from the DC bus 19 follows the reference function with predetermined droop characteristics in a predetermined control cycle. Meanwhile, the "droop characteristics" indicate dropping characteristics, and are characteristics that a relationship between the local voltage and an input/output amount of the local electric power is other than a relationship in which the input/output amount of the electric power is constant over a predetermined voltage range and a relationship in which voltage is constant over a range of a predetermined input/output amount of the electric power.

As a specific example, as illustrated in FIG. 2, when the power network 10 operates normally, the AC/DC converter 11 that is connected to the commercial power system 100 performs droop control on an input from the commercial power system 100 by a reference function of maximizing the droop characteristics in a normal operation zone such that the power supply from the commercial power system 100 is mainly used and power is stably supplied to the power network 10. In contrast, when the power network 10 is in a quasi-normal operation zone or a transient operation zone (in FIG. 2, a quasi-normal operation zone and the transient operation zone in an upper part in which the value of the voltage (V) is high) in which the demand for electric power is low, power supply from the commercial power system 100 is blocked, and, when the power network 10 is in a quasi-normal operation zone or a transient operation zone (in FIG. 2, a quasi-normal operation zone and a transient operation zone in a lower part in which the value of the voltage (V) is low) in which the demand for electric power is high, an input/output constant zone (a vertical zone in FIG. 2) is provided in which input and output of power is maintained at constant values such that power supply from the commercial power system 100 does not exceed contract power.

The first DC/DC converter 13 that converts the direct-current power input from the DC bus 19 to the charging voltage of the in-vehicle battery of the electric vehicle 18 that is a charging target and outputs the charging voltage has a function to perform control such that a relationship between the local voltage (V) and the local electric power (P), in other words, a relationship between the local voltage (V) and the electric power (P) that is input from the DC bus 19 has predetermined characteristics. In other words, the first DC/DC converter 13 has a function to control an output of the EV charger 17 such that the relationship between the local voltage (V) and the electric power (P) that is input from the DC bus 19 follows a reference function with predetermined characteristics in a predetermined control cycle.

As a specific example, as illustrated in FIG. 2, the first DC/DC converter 13 that is connected to the EV charger 17 controls the output of the EV charger 17 in a stepped manner when the power network 10 is in the transient operation zone in which the demand for electric power is high. In contrast, when the power network 10 is in the quasi-normal operation zone in which the demand for electric power is high, the normal operation zone, the quasi-normal operation zone in which the demand for electric power is low, or the transient operation zone in which the demand for electric power is low, control on the output of the EV charger 17 is not performed. In FIG. 2, the reference function that is a control objective function of the EV charger 17 is not a reference function with droop characteristics, and output control on the EV charger 17 is not the droop control.

The bidirectional DC/DC converter 12 that is connected to the stationary power storage device 14 has a function to perform droop control on operation of the stationary power storage device 14 such that a relationship between the local voltage (V) and the local electric power (P), in other words, a relationship between the local voltage (V) and the electric power (P) that is charged and discharged from the stationary power storage device 14, follows a reference function with predetermined droop characteristics. In other words, the bidirectional DC/DC converter 12 performs control such that the relationship between the local voltage (V) and the local electric power (P) maintains the reference function with the predetermined droop characteristics in a predetermined control cycle.

Specifically, as illustrated in FIG. 2, the bidirectional DC/DC converter 12 that is connected to the stationary power storage device 14 provides a dead zone as the input/output constant zone in which charging and discharging is not performed in the normal operation zone, and performs droop control so as to perform discharging by a reference function with droop characteristics in the quasi-normal operation zone in which the demand for electric power is high. Furthermore, the bidirectional DC/DC converter 12 performs droop control so as to perform charging by the reference function with the droop characteristics in the quasi-normal operation zone in which the demand for electric power is low.

As described above, the power system 1 is configured to follow the predetermined reference functions so as to change the outputs of the photovoltaic device (PV) 15 and the EV charger 17 in accordance with a change in the voltage of the entire power system 1. Furthermore, in the power system 1, each of power elements (each of the devices and each of the power converters connected to each of the devices) performs primary control in a distributed manner on the basis of the local voltage and the local electric power. In other words, control on the operation of the devices based on the reference functions is the primary control, and the primary control is performed based on the local voltage of each of the devices connected to the power converters.

Moreover, the power system 1 further has a function of secondary control for updating the reference functions in accordance with power situations of the plurality of power elements. The secondary control is control based on a relationship between an amount of discharge output from the DC bus 19 to which the plurality of power elements are electrically connected and an amount of power received by the DC bus 19. In other words, the secondary control is control of updating a function of the primary control provided in a predetermined power converter while reflecting not only a local power situation but also power situations of the other power converters included in the power system 1.

As illustrated in FIG. 3, in the power system 1, through the secondary control, the reference function provided in each of the power converters such as the AC/DC converter 11, the bidirectional DC/DC converter 12, the first DC/DC converter 13, and the second DC/DC converter 16 is comprehensively determined, and the reference function provided in each of the power converters such as the AC/DC converter 11, the bidirectional DC/DC converter 12, the first DC/DC converter 13, and the second DC/DC converter 16 is optimally updated. To update the reference function provided in each of the power converters, a computer, such as artificial intelligence (AI), may be used, for example.

The secondary control for updating the reference functions is performed based on a command of the central control unit 110, for example. Therefore, the power system 1 further includes the central control unit 110 that controls each of the power converters such as the AC/DC converter 11, the bidirectional DC/DC converter 12, the first DC/DC converter 13, and the second DC/DC converter 16. In the power system 1, the central control unit 110 performs the secondary control on the AC/DC converter 11, the bidirectional DC/DC converter 12, the first DC/DC converter 13, and the second DC/DC converter 16. The central control unit 110 is connected to each of the power converters such as the AC/DC converter 11, the bidirectional DC/DC converter 12, the first DC/DC converter 13, and the second DC/DC converter 16 via a communication means, for example. Therefore, the secondary control performed by the central control unit 110 is a central control method. The central control unit 110 is an energy management system (EMS). Meanwhile, a program causes a processor to perform the primary control and the secondary control in each of the power converters or the central control unit 110, for example.

For example, in the secondary control, if telecommunication between the central control unit 110 and each of the power converters complies with the TCP/IP protocol, function information on the reference function is included in a data part of an IP packet of a command signal for updating the function. If the reference function has the droop characteristics, the function information may be, for example, coordinate information on a boundary of a function (droop function) representing the droop characteristics, intercept information on the droop function, information on a slope (in other words, a droop coefficient), or information on a shape (a line, a curve, or the like). The function information includes information on the input/output constant zone. Furthermore, as for the function information in the case where the reference function does not have the droop characteristics, if constant voltage control is adopted for example, the function information may be information indicating the constant voltage control or information on a control target voltage value as a control value, maximum electric power as an electric power upper limit value, or minimum electric power as an electric power lower limit value, and, if constant power control is adopted for example, the function information may be information indicating the constant power control or information on a control target power value as a control value. The pieces of information as described above are pieces of information that are defined in the P-V coordinate, for example. In the data part of the IP packet, information to be updated among the pieces of the above-described information is included as a data row. The function information to be used for the update is stored in the storage unit of the central control unit 110, and the control unit appropriately reads and uses the function information.

In contrast, the primary control in which the operation of the photovoltaic device (PV) 15, the EV charger 17, or the like follows the reference function is performed based on the local voltage of the photovoltaic device (PV) 15, the EV charger 17, or the like as described above, without via a command of the central control unit 110.

The secondary control of updating the reference functions is performed based on a command of the central control unit 110 and the primary control of controlling input and output of the devices based on the reference functions is performed based on the local voltage of the photovoltaic device (PV) 15, the EV charger 17, or the like without via a command of the central control unit 110; therefore, it is possible to accurately reflect needed electric power of the entire power network 10, which varies with time, when controlling the output of the photovoltaic device (PV) 15 or the EV charger 17. Consequently, the control of the entire power network 10 including various kinds of devices, such as the photovoltaic device (PV) 15 and the EV charger 17, is optimized, and it is also possible to efficiently supply needed electric power to the entire power network 10.

In the power system 1, to optimize the control on the entire power network 10 that includes various kinds of devices, such as the photovoltaic device (PV) 15 and the EV charger 17, the reference function that controls the operation of the photovoltaic device (PV) 15 has characteristics to change a threshold voltage for output suppression that is one mode of the output control on the photovoltaic device (PV) 15, in accordance with time. Specifically, the reference function for controlling the operation of the photovoltaic device (PV) 15 has predetermined time-limit characteristics.

The reference function for controlling the operation of the photovoltaic device (PV) 15 has inverse time characteristics as the predetermined time-limit characteristics. Specifically, the reference function with the predetermined time-limit characteristics has a relationship as represented by Expression (1) below, where Vr is a threshold voltage value, C is a capacitance of a line (the DC bus 19 in the power system 1), and Tr is a time constant that is determined in accordance with the capacitance, for example.

$$Tr = \text{function}(Vr, C) \quad (1)$$

Here, the function (Vr, C) represents a function of Vr and C. For example, in the case of the output suppression on the photovoltaic device (PV) 15 with respect to an increase in the voltage of the DC bus 19, the function (Vr, C) is set such that Tr decreases with an increase in the threshold voltage value Vr for determining execution of the output suppression. Furthermore, voltage is less likely to change along with a change in an amount of electric current (amount of charge) that is input to and output from the DC bus 19 with an increase in the capacitance C of the DC bus 19 because of a relationship of Q=CV, so that the function (Vr, C) is set so as to allow a certain increase in Tr.

Moreover, assuming that V0 represents local observed voltage of the second DC/DC converter 16, control is performed such that the switching element of the second DC/DC converter 16 suppresses output of electric power from the photovoltaic device (PV) 15 to the DC bus 19 when the state in which V0>Vr is continued for the time Tr (the time constant Tr) or more.

For example, when the local observed voltage V0 of the second DC/DC converter 16 is equal to voltage V1 that is larger than the threshold voltage value Vr by a predetermined value, and if the voltage V1 is continued for a time T1 or more as the time constant Tr that is determined in accordance with the capacitance C, the switching element of the second DC/DC converter 16 reduces the output of the electric power P from the photovoltaic device (PV) 15 to the DC bus 19 to zero. Furthermore, when the local observed voltage V0 of the second DC/DC converter 16 is equal to voltage V2 that is larger than the voltage V1 by a predetermined value, and if the voltage V2 is continued for a time T2 or more, which is shorter than T1 as the time constant Tr, the switching element of the second DC/DC converter 16 reduces the output of the electric power P from the photovoltaic device (PV) 15 to the DC bus 19 to zero. Moreover, when the local observed voltage V0 of the second DC/DC converter 16 is equal to voltage V3 that is larger than the voltage V2 by a predetermined value, and if the voltage V3 is continued for a time T3 or more, which is shorter than T2 as the time constant Tr, the switching element of the second DC/DC converter 16 reduces the output of the electric power P from the photovoltaic device (PV) 15 to the DC bus 19 to zero. In other words, with an increase in the observed voltage V0, a time since observation of the state in which V0>Vr until suppression of the output of the electric power decreases.

As a specific example, as illustrated in FIG. 4, when the local observed voltage V0 of the second DC/DC converter 16 is equal to 420 V that is larger than the threshold voltage value Vr (for example, 400 V for convenience of explanation) by 20 V, and if 420 V is continued for the time T1 (for example, 1.0 second for convenience of explanation) or more as the time constant Tr, the switching element of the second DC/DC converter 16 performs control such that the output of the electric power P from the photovoltaic device (PV) 15 to the DC bus 19 reaches zero. Furthermore, when the local observed voltage V0 of the second DC/DC converter 16 is equal to 440 V that is larger than the threshold voltage value Vr (for example, 400 V) by 40 V, and if 440 V is continued for the time T2 (for example, 0.1 second for convenience of explanation) or more as the time constant Tr, the switching element of the second DC/DC converter 16 performs control such that the output of the electric power P from the photovoltaic device (PV) 15 to the DC bus 19 reaches zero. Moreover, when the local observed voltage V0 of the second DC/DC converter 16 is equal to 460 V that is larger than the threshold voltage value Vr (for example, 400 V) by 60 V, and if 460 V is continued for the time T3 (for example, 0.01 second for convenience of explanation) or more as the time constant Tr, the switching element of the second DC/DC converter 16 performs control such that the output of the electric power P from the photovoltaic device (PV) 15 to the DC bus 19 reaches zero. Meanwhile, in FIG. 4, the reference function for controlling the operation of the photovoltaic device (PV) 15 does not have the droop characteristics, so that the output control on the photovoltaic device (PV) 15 is not the droop control.

Furthermore, the reference function for controlling the operation of the photovoltaic device (PV) 15 has characteristics to change a threshold voltage for output promotion that is one mode of the output control on the photovoltaic device (PV) 15, in accordance with time. Specifically, a reference function for controlling output promotion operation of the photovoltaic device (PV) 15 has predetermined time-limit characteristics.

For example, the reference function with the predetermined time-limit characteristics for controlling the output promotion operation of the photovoltaic device (PV) 15 has a relationship as represented by Expression (2) below, where Vr2 is a threshold voltage value, C is a capacitance of a line (the DC bus 19 in the power system 1), and Tr2 is a time constant that is determined in accordance with the capacitance, for example.

$$Tr2 = \text{function}(Vr2, C) \quad (2)$$

Here, the function (Vr2, C) represents a function of Vr2 and C. For example, in the case of the output promotion on the photovoltaic device (PV) 15 with respect to a decrease in the voltage of the DC bus 19, the function (Vr2, C) is set such that Tr2 decreases with a decrease in the threshold voltage value Vr2 for determining execution of the output promotion. Furthermore, voltage is less likely to change along with a change in the amount of electric current (amount of charge) that is input to and output from the DC bus 19 with an increase in the capacitance C of the DC bus 19 because of the relationship of Q=CV, so that the function (Vr2, C) is set so as to allow a certain increase in Tr2.

Moreover, assuming that V0 represents the local observed voltage of the second DC/DC converter 16, control is performed such that the switching element of the second DC/DC converter 16 promotes output of electric power from the photovoltaic device (PV) 15 to the DC bus 19 when the state in which V0<Vr2 is continued for the time Tr2 (the time constant Tr2) or more.

For example, when the local observed voltage V0 of the second DC/DC converter 16 is equal to voltage V11 that is smaller than the threshold voltage value Vr2 by a predetermined value, and if voltage in this range is continued for a time T11 or more as the time constant Tr2 that is determined in accordance with the capacitance C, the switching element of the second DC/DC converter 16 increases the output of the electric power P from the photovoltaic device (PV) 15 to the DC bus 19. Furthermore, when the local observed voltage V0 of the second DC/DC converter 16 is equal to voltage V12 that is smaller than the voltage V11 by a predetermined value, and if voltage in this range is continued for a time T12 or more, which is shorter than T11 as the time constant Tr2, the switching element of the second DC/DC converter 16 increases the output of the electric power P from the photovoltaic device (PV) 15 to the DC bus 19. Moreover, when the local observed voltage V0 of the second DC/DC converter 16 is equal to voltage V13 that is smaller than the voltage V12 by a predetermined value, and if voltage in this range is continued for a time T13 or more, which is shorter than T12 as the time constant Tr2, the switching element of the second DC/DC converter 16 increases the output of the electric power P from the photovoltaic device (PV) 15 to the DC bus 19. Furthermore, when the local observed voltage V0 of the second DC/DC converter 16 is equal to or smaller than voltage V14 that is smaller than the voltage V13 by a predetermined amount, the switching element of the second DC/DC converter 16 immediately increases the output of the electric power P from the photovoltaic device (PV) 15 to the DC bus 19. In other words, with a decrease in the observed voltage V0, the time since observation of the state in which V0<Vr2 until execution of the output promotion on the electric power P decreases. Meanwhile, if V0=Vr2 due to an increase in the output of the electric power P, the switching element of the second DC/DC converter 16 stops an increase in the output of the electric power P.

Figure 8:
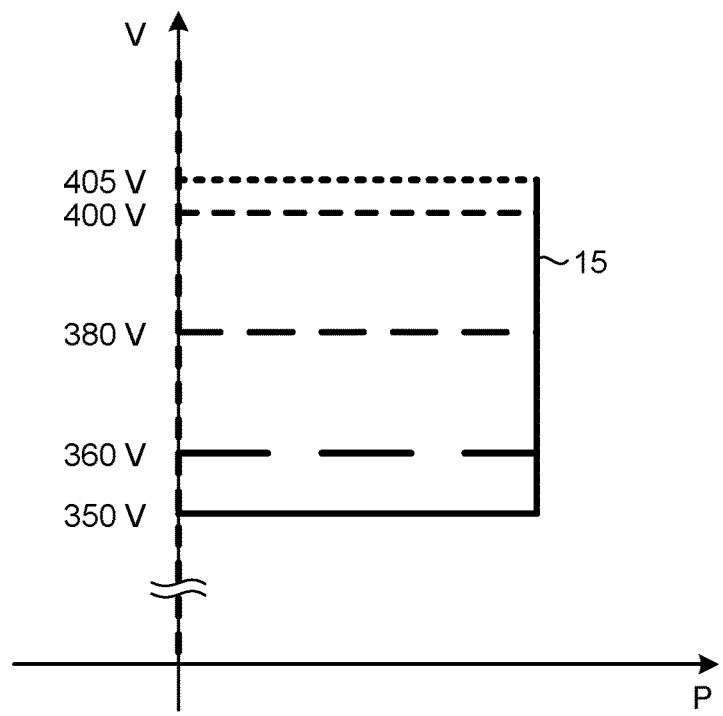
FIG. 8 illustrates an example of a reference function that has time limit characteristics and that is given to the photovoltaic device (PV) used in the power system including the power converter.

As a specific example, as illustrated in FIG. 8, when the local observed voltage V0 of the second DC/DC converter 16 is equal to 400 V that is lower than the threshold voltage value Vr2 (for example, 405 V for convenience of explanation) by 5 V, and if 400 V or less is continued for the time T11 (for example, 1.0 second for convenience of explanation) or more as the time constant Tr2, the switching element of the second DC/DC converter 16 increases the output of the electric power P from the photovoltaic device (PV) 15 to the DC bus 19. Furthermore, when the local observed voltage V0 of the second DC/DC converter 16 is equal to 380 V that is lower than the threshold voltage value Vr2 by 25 V, and if 380 V or less is continued for the time T12 (for convenience of explanation, for example, 0.5 second) or more as the time constant Tr2, the switching element of the second DC/DC converter 16 increases the output of the electric power P from the photovoltaic device (PV) 15 to the DC bus 19. Moreover, when the local observed voltage V0 of the second DC/DC converter 16 is equal to 360 V that is lower than the threshold voltage value Vr2 by 45 V, and if 360 V or less is continued for the time T13 (for convenience of explanation, for example, 0.1 second) or more as the time constant Tr2, the switching element of the second DC/DC converter 16 increases the output of the electric power P from the photovoltaic device (PV) 15 to the DC bus 19. Furthermore, when the local observed voltage V0 of the second DC/DC converter 16 is equal to or smaller than 350 V, the switching element of the second DC/DC converter 16 immediately increases the output of the electric power P from the photovoltaic device (PV) 15 to the DC bus 19. Specifically, for example, counting of time is started when the observed voltage V0 reaches 400 V or less, and if the observed voltage V0 of 380 V to 400 V is continued for 0.4 second and thereafter the observed voltage V0 of 360 V to 380 V is continued for 0.1 second, the total counted time reaches 0.5 second, so that the output of the electric power P from the photovoltaic device (PV) 15 to the DC bus 19 is increased. Furthermore, for example, counting of time is started when the observed voltage V0 reaches 400 V or less, and if the observed voltage V0 of 380 V to 400 V is continued for 0.8 second and thereafter the observed voltage V0 reaches 380 V or less, the total counted time exceeds 0.5 second, so that the output of the electric power P from the photovoltaic device (PV) 15 to the DC bus 19 is immediately increased. Meanwhile, in FIG. 8, the reference function for controlling the operation of the photovoltaic device (PV) 15 does not have the droop characteristics, so that the output control on the photovoltaic device (PV) 15 is not the droop control.

The reference function for controlling the operation of the photovoltaic device (PV) 15 has the characteristics to change the threshold voltage for the output suppression and the output promotion on the photovoltaic device (PV) 15 in accordance with the time as described above, in particular, the time-limit characteristics, so that even if disturbance occurs in the power network 10, the output control on the photovoltaic device (PV) is adjusted in accordance with a degree of a change in the voltage, and the voltage of the DC bus 19 that is electrically connected to the photovoltaic device (PV) 15 via the second DC/DC converter 16 is stabilized. Furthermore, with the time-limit characteristics as described above, it is possible to reduce frequency of occurrence of the output suppression and the output promotion on the photovoltaic device (PV) 15, so that it is possible to improve power efficiency of the photovoltaic device (PV) 15.

In particular, the time-limit characteristics are given to the reference function for controlling the operation of the photovoltaic device (PV) 15 by using the local threshold voltage value of the photovoltaic device (PV) 15, the capacitance of the DC bus 19, and the time constant that is determined in accordance with the capacitance of the DC bus 19, so that it is possible to reliably stabilize the voltage of the power network 10, and reliably improve the power efficiency of the photovoltaic device (PV) 15.

Furthermore, to optimize the control on the entire power network 10 that includes the various kinds of devices, such as the photovoltaic device (PV) 15 and the EV charger 17, the reference function for controlling the operation of the EV charger 17 that is a load has characteristics to change a threshold voltage for output suppression on the EV charger 17, in accordance with time. Specifically, the reference function for controlling the operation of the EV charger 17 has predetermined time-limit characteristics.

Specifically, for example, the reference function with the predetermined time-limit characteristics has a relationship as represented by Expression (1) below, where Vr is a threshold voltage value, C is a capacitance of a line (the DC bus 19 in the power system 1), and Tr is a time constant that is determined in accordance with the capacitance.

$$Tr = \text{function}(Vr, C) \tag{1}$$

Here, the function (Vr, C) represents a function of Vr and C, but Vr and the function (Vr, C) need not be the same as Vr and the function (Vr, C) for the photovoltaic device (PV) 15, and Tr need not be the same. For example, in the case of the output suppression on the EV charger 17 with respect to a decrease in the voltage of the DC bus 19, the function (Vr, C) is set such that Tr decreases with a decrease in the threshold voltage value Vr for determining execution of the output suppression. Furthermore, voltage is less likely to change along with a change in the amount of electric current (amount of charge) that is input to and output from the DC bus 19 with an increase in the capacitance C of the DC bus 19, so that the function (Vr, C) is set so as to allow a certain increase in Tr.

Moreover, assuming that V0 represents local observed voltage of the first DC/DC converter 13, control is performed such that the switching element of the first DC/DC converter 13 suppresses input of electric power from the DC bus 19 to the EV charger 17, in other words, suppresses output from the EV charger 17 to the electric vehicle 18, when the state in which V0<Vr is continued for Tr or more.

For example, when the local observed voltage V0 of the first DC/DC converter 13 is equal to voltage V4 that is smaller than the threshold voltage value Vr by a predetermined amount, and if the voltage V4 is continued for the time T4 or more as the time constant Tr that is determined in accordance with the capacitance C, the switching element of the first DC/DC converter 13 reduces input of the electric power P from the DC bus 19 to the EV charger 1 (in other words, output of the electric power from the EV charger 17 to the electric vehicle 18). In other words, the switching element of the first DC/DC converter 13 suppresses the amount of supply of a charging current from the DC bus 19 to the EV charger 17. Furthermore, when the local observed voltage V0 of the first DC/DC converter 13 is equal to voltage V5 that is smaller than the voltage V4 by a predetermined amount, and if the voltage V5 is continued for a time T5 or more, which is shorter than T4 as the time constant Tr, the switching element of the first DC/DC converter 13 reduces the input of the electric power P from the DC bus 19 to the EV charger 17. Moreover, when the local observed voltage V0 of the first DC/DC converter 13 is equal to voltage V6 that is smaller than the voltage V5 by a predetermined amount, and if the voltage V6 is continued for a time T6 or more, which is shorter than T5 as the time constant Tr, the switching element of the first DC/DC converter 13 reduces the input of the electric power P from the DC bus 19 to the EV charger 17. In other words, with an increase in the observed voltage V0, a time since observation of the state in which V0>Vr until execution of the input suppression on the electric power decreases.

As a specific example, when the local observed voltage V0 of the first DC/DC converter 13 is equal to 340 V that is smaller than the threshold voltage value Vr (for example, 360 V for convenience of explanation) by 20 V, and if 340 V is continued for a time T4 (for convenience of explanation, for example, 1.0 second) or more as the time constant Tr, the switching element of the first DC/DC converter 13 reduces the input of the electric power P from the DC bus 19 to the EV charger 17, in other words, the amount of supply of the charging current. Furthermore, when the local observed voltage V0 of the first DC/DC converter 13 is equal to 320 V that is smaller than the threshold voltage value Vr (for example, 360 V) by 40 V, and if 320 V is continued for a time T5 (for example, 0.1 second for convenience of explanation) or more as the time constant Tr, the switching element of the first DC/DC converter 13 reduces the input of the electric power P from the DC bus 19 to the EV charger 17. Moreover, when the local observed voltage V0 of the first DC/DC converter 13 is equal to 300 V that is smaller than the threshold voltage value Vr (for example, 360 V) by 60 V, and if 300 V is continued for a time T6 (for example, 0.01 second for convenience of explanation) or more as the time constant Tr, the switching element of the first DC/DC converter 13 reduces the input of the electric power P from the DC bus 19 to the EV charger 17. The reference function for controlling the operation of the EV charger 17 does not have the droop characteristics, so that the input control on the EV charger 17 is not the droop control.

Furthermore, the reference function for controlling the operation of the EV charger 17 has characteristics to change a threshold voltage for output promotion on the EV charger 17 in accordance with time. Specifically, the reference function for controlling the operation of the EV charger 17 has predetermined time-limit characteristics.

Specifically, for example, the reference function with the predetermined time-limit characteristics 15 has a relationship as represented by Expression (3) below, where Vr3 is a threshold voltage value, C is a capacitance of a line (the DC bus 19 in the power system 1), and Tr is a time constant that is determined in accordance with the capacitance, for example.

$$Tr3 = \text{function}(Vr3, C) \quad (3)$$

Here, the function (Vr3, C) represents a function of Vr3 and C. For example, in the case of the output promotion on the EV charger 17 with respect to an increase in the voltage of the DC bus 19, the function (Vr3, C) is set such that Tr3 decreases with an increase in the threshold voltage value Vr3 for determining execution of the output promotion. Furthermore, voltage is less likely to change along with a change in the amount of electric current (amount of charge) that is input to and output from the DC bus 19 with an increase in the capacitance C of the DC bus 19, so that the function (Vr3, C) is set so as to allow a certain increase in Tr3.

Moreover, assuming that V0 represents the local observed voltage of the first DC/DC converter 13, control is performed such that the switching element of the first DC/DC converter 13 performs input promotion from the DC bus 19 to the EV charger 17, in other words, output promotion from the EV charger 17 to the electric vehicle 18 when the state in which V0>Vr3 is continued for Tr3 or more.

For example, when the local observed voltage V0 of the first DC/DC converter 13 is equal to voltage V15 that is larger than the threshold voltage value Vr3 by a predetermined amount, and if voltage in this range is continued for a time T14 or more as the time constant Tr3 that is determined in accordance with the capacitance C, the switching element of the first DC/DC converter 13 increases output of the electric power P from the DC bus 19 to the EV charger 17 (in other words, output of the electric power P from the EV charger 17 to the electric vehicle 18). In other words, the switching element of the first DC/DC converter 13 increases the amount of supply of the charging current from the DC bus 19 to the EV charger 17. Furthermore, when the local observed voltage V0 of the first DC/DC converter 13 is equal to voltage V16 that is larger than the voltage V15 by a predetermined value, and if voltage in this range is continued for a time T15 or more, which is shorter than T14 as the time constant Tr3 that is determined in accordance with the capacitance C, the switching element of the first DC/DC converter 13 increases the output of the electric power P from the DC bus 19 to the EV charger 17. Moreover, when the local observed voltage V0 of the first DC/DC converter 13 is equal to voltage V17 that is larger than the voltage V16 by a predetermined value, and if voltage in this range is continued for a time T16, which is shorter than T15 as the time constant Tr3 that is determined in accordance with the capacitance C, the switching element of the first DC/DC converter 13 increases the output of the electric power P from the DC bus 19 to the EV charger 17. Furthermore, when the local observed voltage V0 of the first DC/DC converter 13 is equal to or larger than voltage V18 that is larger than the voltage V17 by a predetermined value, the switching element of the first DC/DC converter 13 immediately increases the output of the electric power P from the DC bus 19 to the EV charger 17. In other words, with an increase in the observed voltage V0, the time since observation of the state in which V0>Vr3 until execution of the output promotion on the electric power decreases.

Figure 9:
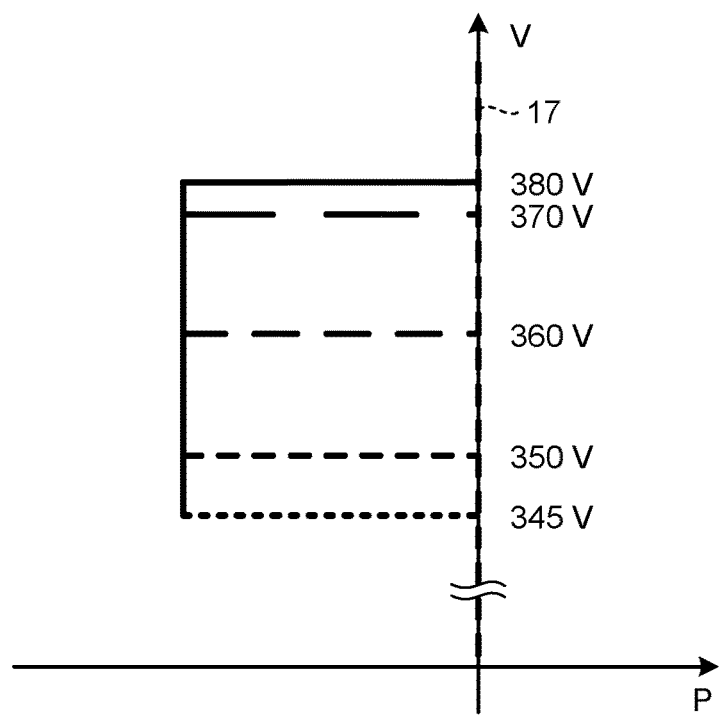
FIG. 9 illustrates an example of a reference function that has time limit characteristics and that is given to an EV charger used in the power system including the power converter.

As a specific example, as illustrated in FIG. 9, when the local observed voltage V0 of the first DC/DC converter 13 is equal to 350 V that is larger than the threshold voltage value Vr3 (for example, 345 V for convenience of explanation) by 5 V, and if 350 V or more is continued for a time T14 (for example, 1.0 second for convenience of explanation) as the time constant Tr3, the switching element of the first DC/DC converter 13 increases the input of the electric power P from the DC bus 19 to the EV charger 17, in other words, the amount of supply of the charging current. Furthermore, when the local observed voltage V0 of the first DC/DC converter 13 is equal to 360 V that is larger than the threshold voltage value Vr3 by 15 V, and if 360 V or more is continued for a time T15 (for example, 0.5 second for convenience of explanation) or more as the time constant Tr3, the switching element of the first DC/DC converter 13 increases the input of the electric power P from the DC bus 19 to the EV charger 17. Moreover, when the local observed voltage V0 of the first DC/DC converter 13 is equal to 370 V that is larger than the threshold voltage value Vr3 by 25 V, and if 370 V or more is continued for a time T16 (for example, 0.1 second for convenience of explanation) or more as the time constant Tr3, the switching element of the first DC/DC converter 13 increases the input of the electric power P from the DC bus 19 to the EV charger 17. Furthermore, when the local observed voltage V0 of the first DC/DC converter 13 is equal to or larger than 380 V that is larger than the threshold voltage value Vr3 by 35 V, the switching element of the first DC/DC converter 13 immediately increases the input of the electric power P from the DC bus 19 to the EV charger 17. The reference function for controlling the operation of the EV charger 17 does not have the droop characteristics, so that the output control on the EV charger 17 is not the droop control.

Meanwhile, as a method of limiting the input to the EV charger 17 by the reference function with the time-limit characteristics, for example, a method of suppressing the amount of charging current to the EV charger 17 may be adopted, and, when the plurality of EV chargers 17 are provided, a method of maintaining a steady state of the amount of charging current to a part of the EV chargers 17 and blocking supply of the charging current to another part of the EV chargers 17 may be adopted.

The reference function for controlling the operation of the EV charger 17 that is a load has the characteristics to change the threshold voltage for the input suppression and the input promotion on the EV charger 17 as described above, in particular, the time-limit characteristics, so that even if disturbance occurs in the power network 10, the input control on the EV charger 17 is adjusted in accordance with a degree of a change in the voltage, and the voltage of the DC bus 19 that is electrically connected to the EV charger 17 via the first DC/DC converter 13 is stabilized. Furthermore, with the time-limit characteristics as described above, it is possible to reduce frequency of occurrence of the input suppression and the input promotion on the EV charger 17 (in other words, the output suppression and the output promotion from the EV charger 17 to the electric vehicle 18), so that it is possible to improve power efficiency of the EV charger 17.

The time-limit characteristics are given to the reference function for controlling the operation of the EV charger 17 by using the local threshold voltage value of the EV charger 17, the capacitance of the DC bus 19, and the time constant that is determined in accordance with the capacitance of the DC bus 19, so that it is possible to reliably stabilize the voltage of the power network 10, and reliably improve the power efficiency of the EV charger 17 to which the electric power is supplied.

A specific configuration example of the power converter, such as the first DC/DC converter 13 or the second DC/DC converter 16, will be described below. The second DC/DC converter 16 will be described below as an example.

As illustrated in FIG. 5, the power converter (the second DC/DC converter 16) includes an input unit 16a that is electrically connected to the device (the photovoltaic device (PV) 15 in FIG. 5) that is able to input electric power from the line (the DC bus 19) and/or output electric power to the line, a voltage change unit 16b as a switching element that is connected to the input unit 16a and that changes voltage, a voltage adjustment unit 16c that is connected to the voltage change unit 16b and the line and that adjusts voltage supplied to the line, a target setting unit 16d that determines a first target value of the voltage change unit 16b, a voltage monitoring unit 16g that is connected to the line and that observes voltage of the line, a threshold determination mechanism 16e that is connected to the voltage monitoring unit 16g and the target setting unit 16d and that calculates a second target value of the voltage adjustment unit 16c in accordance with the voltage of the line. The threshold determination mechanism 16e functions as a determination unit that determines presence or absence of abnormality in the voltage value that is observed by the voltage monitoring unit 16g. Furthermore, a memory 16f is connected to the threshold determination mechanism 16e. The memory 16f is a storage means for storing a table that indicates a relationship between voltage that is larger or smaller than the threshold voltage value as described above by a predetermined value (magnitude of the voltage and continuation time of the voltage) and the time constant Tr of the voltage.

The second DC/DC converter 16 has characteristics that the target setting unit 16d generates the first target value as an output target of the voltage change unit 16b in accordance with the voltage of the line of the DC bus 19 observed by the voltage monitoring unit 16g, and the first target value changes the threshold voltage for the output suppression of the voltage adjustment unit 16c in accordance with the time.

In other words, the reference function as the control objective function generates the first target value for performing autonomous control on the device (the photovoltaic device 15) in accordance with the voltage of the line (the DC bus 19) observed by the voltage monitoring unit 16g, and the second DC/DC converter 16 controls the photovoltaic device 15 based on the reference function.

Meanwhile, the input unit 16a includes, for example, an electrical terminal. The voltage change unit 16b and the voltage adjustment unit 16c correspond to the power conversion unit with the power conversion function. The target setting unit 16d, the threshold determination mechanism 16e, and the memory 16f correspond to the control unit for controlling the power conversion function. The voltage monitoring unit 16g corresponds to the sensor that is used to observe an electrical property.

Method of Controlling Power System

One example of a method of controlling the power system as centralized control will be described below with reference to the sequence diagram in FIG. 7.

First, at Step S201, the central control unit 110 calls a timer of the subject device and starts to measure time. Subsequently, at Step S202, the central control unit 110 requests each of the power converters to provide local measurement information. The local measurement information is one example of information on the power situation of the power system 1, and includes a measurement value that is measured by the sensor of each of the power converters and a measurement time.

Then, at Step S203, each of the power converters transmits the local measurement information to the central control unit 110. The central control unit 110 stores each piece of the local measurement information in the storage unit.

Subsequently, at Step S204, the central control unit 110 requests the external server 200 to provide various kinds of information that may affect the operation of the power system 1, as one example of the information on the power situation of the power system 1. In this example, the central control unit 110 requests the external server 200 to provide power generation amount/demand forecast information. The power generation amount/demand forecast information includes forecast information on the power generation amount of the power system 1 and demand forecast information on the electric power, and may include, for example, information on a season in a region in which the power system 1 is installed, a current weather, a weather forecast, or the like. Furthermore, when the external server 200 functions as an EMS for a different power system, and if an operating state of the different power system may affect the operation of the power system 1, the electric power generation/demand forecast information may include forecast information on a power generation amount of the different power system and demand forecast information on the electric power.

Then, at Step S205, the external server 200 transmits the electric power generation/demand forecast information to the central control unit 110. The central control unit 110 stores the electric power generation/demand forecast information in the storage unit.

Subsequently, at Step S206, the control unit of the central control unit 110 reads each piece of the transmitted information, in other words, the information on the power situation of the power system 1 from the storage unit, and performs operation optimization calculation on the power system 1.

The operation optimization calculation is performed to meet various conditions. For example, it is assumed that the power system 1 is controlled such that the DC bus 19 reaches a predetermined voltage operating point. In this state, it is assumed that the central control unit 110 forecasts that, based on the electric power generation/demand forecast information, the upcoming weather in the region in which the photovoltaic device 15 is installed is sunny and the amount of electric power produced will increase, and determines that a plenty of electric power is supplied to the photovoltaic device 15, on the basis of the local measurement information acquired from the second DC/DC converter 16 that is connected to the photovoltaic device 15. In this case, the central control unit 110 determines that the reference function of the bidirectional DC/DC converter 12 that is connected to the stationary power storage device 14 is updated such that the stationary power storage device 14 is charged at the operating point. Furthermore, the central control unit 110 determines that the reference function of the AC/DC converter 11 is updated at the same time as the update as described above, so as to prevent supply of electric power from the commercial power system 100. Meanwhile, the reference function may be changed instead of being updated.

Moreover, the operation optimization calculation may be performed by setting conditions from the viewpoint of preventing excess of contract power of the commercial power system 100 or from the viewpoint of optimization of electricity prices, by adopting peak cut or making use of night power.

Furthermore, the storage unit of the central control unit 110 stores therein a trained model, and the central control unit 110 may perform the operation optimization calculation by using the trained model. As the trained model, for example, a trained model that is generated by deep learning using a neural network, while adopting, as teacher data, information on the power situation of the power system 1 and a result of update of the reference function of each of the power converters corresponding to the power situation.

Subsequently, at Step S207, the central control unit 110 performs a step of outputting a command for updating the reference function to a power converter that is an update target among the power converters, and updating the reference function. Then, at Step S208, the central control unit 110 resets a timer. Subsequently, each of the power converters performs autonomous control at Step S209. The autonomous control is autonomous control in which the power situation of the power system 1 is reflected, and all of the power converters are controlled in a cooperative manner.

Another embodiment of the power converter and the power system will be described below. In the power converter and the power system of the embodiment as described above, the photovoltaic device (PV) 15 is provided as the power generation device using the reference function with the time-limit characteristics; however, it may be possible to use a power generation device that generates electric power by using fuel. Furthermore, in the power converter and the power system of the embodiment as described above, the EV charger 17 is provided as the load; however, it may be possible to provide a different load, such as a house, (for example, the load L illustrated in FIG. 5), instead of the EV charger 17 or in addition to the EV charger 17, and the different load may be connected to the AC/DC converter 11.

In the power converter and the power system of the embodiment as described above, the reference function with the time-limit characteristics is configured to change the amount of input and output of local electric power in accordance with a change in the local voltage; however, it may be possible to change the amount of input and output of a local electric current in accordance with a change in the local voltage.

Furthermore, as a method of causing the relationship between the local voltage and the local electric power to follow the reference function with the time-limit characteristics, for example, it may be possible to adopt a method in which the power converter observes the local voltage, sets electric power of a target value from the reference function, and causes electric power to follow the electric power of the target value, or it may be possible to adopt a method in which the power converter observes the local electric power, sets voltage of a target value from the reference function, and causes voltage to follow the voltage of the target value.

Moreover, in the power system of the embodiment as described above, the power converters other than the second DC/DC converter 16, to which the photovoltaic device (PV) 15 as the power generation device is connected, and/or the first DC/DC converter 13, to which the EV charger 17 is connected, control operation of devices so as to follow the reference function of generating a target value when performing autonomous control on the devices connected to the other power converters in accordance with voltage observed by the other power converters; however, alternatively, the control performed by the power converters other than the second DC/DC converter 16 and/or the first DC/DC converter 13 need not always be the control based on the reference function.

Furthermore, in the power system of the embodiment as described above, the central control unit 110 is separately provided and the central control unit 110 centrally performs update of the reference function as the secondary control; however, alternatively, the central control unit need not always perform the secondary control. Moreover, in the power system of the embodiment as described above, the central control unit centrally performs the secondary control; however, alternatively, at least one of the power converters may be configured to have a function of the central control unit that controls the plurality of power converters.

The power converter and the power system are able to improve power efficiency of a device included in a power network, while stabilizing voltage even if disturbance occurs in the power network, and therefore has high utility value in, in particular, the field of DC grid including a power network that is locally produced and consumed.

According to one embodiment of a power converter and a power system including the power converter, the power converter generates a target value as an output target of a voltage change unit of the power converter in accordance with voltage of a transmission line that is observed by a voltage monitoring unit of the power converter, and the target value has characteristics to change a threshold voltage for controlling output of a voltage adjustment unit of the power converter depending on time; therefore, when disturbance occurs in a power network, it is possible to stabilize the voltage of the transmission line to which the device is electrically connected via the power converter, and it is possible to improve power efficiency of the device included in the power network.

According to one embodiment of the power converter and the power system including the power converter, a reference function with characteristics to change a threshold voltage for output suppression depending on time has a relationship represented by Tr=function (Vr, C), where Vr is a threshold voltage value, C is a capacitance of the transmission line, and Tr is a time constant that is determined in accordance with the capacitance, and control is performed such that the voltage change unit of the power converter suppresses output of electric power from the device to the transmission line when a state in which V0>Vr is continued for a time Tr or more, where V0 is local observed voltage of the power converter; therefore, it is possible to more reliably stabilize the voltage of the power network, and it is possible to more reliably improve the power efficiency of the device included in the power network.

According to one embodiment of the power converter and the power system including the power converter, a reference function with characteristics to change a threshold voltage for input suppression depending on time has a relationship represented by Tr=function (Vr, C), where Vr is a threshold voltage value, C is a capacitance of the transmission line, and Tr is a time constant that is determined in accordance with the capacitance, and control is performed such that the voltage change unit of the power converter suppresses input of electric power from the transmission line to the device when a state in which V0<Vr is continued for a time Tr or more, where V0 is local observed voltage of the power converter; therefore, it is possible to more reliably stabilize the voltage of the power network, and it is possible to more reliably improve the power efficiency of the device included in the power network.

According to one embodiment of a method of controlling the power converter, a method of controlling the power system, and a program, when disturbance occurs in the power network, it is possible to stabilize voltage of a transmission line to which a device is electrically connected via a power converter, and it is possible to improve power efficiency of the device included in the power network.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power converter for being connected to a transmission line, the power converter comprising:
    an input unit configured to be electrically connected to a device that is able to input electric power from the transmission line and/or output electric power to the transmission line;
    a voltage change unit connected to the input unit and configured to change voltage;
    a voltage adjustment unit connected to the voltage change unit and configured to adjust the voltage supplied to the transmission line;
    a target setting unit configured to set a first target value of the voltage change unit;
    a voltage monitoring unit connected to the transmission line and configured to observe the voltage of the transmission line; and
    a threshold determination mechanism connected to the voltage monitoring unit and configured to calculate a second target value of the voltage adjustment unit in accordance with voltage of the transmission line, wherein
    the target setting unit of the power converter is configured to generate the first target value as an output target of the voltage change unit in accordance with the voltage observed by the voltage monitoring unit, and
    the first target value has characteristics to change a threshold voltage for controlling output of the voltage adjustment unit depending on time.

2. The power converter according to claim 1, wherein the device is controlled based on a reference function for generating the first target value when autonomous control is performed on the device, in accordance with the voltage observed by the voltage monitoring unit.

3. The power converter according to claim 2, wherein the reference function has predetermined time-limit characteristics.

4. The power converter according to claim 2, wherein the reference function has a relationship as represented by Expression (1) below, $$Tr=\text{function}(Vr,C) \qquad (1)$$

where Vr is a threshold voltage value, C is a capacitance of the transmission line, and Tr is a time constant that is determined in accordance with the capacitance, and control is performed such that the voltage change unit suppresses output of electric power from the device to the transmission line when a state in which V0>Vr is continued for a time Tr or more, where V0 is local observed voltage of the power converter.

5. The power converter according to claim 2, wherein the reference function has a relationship as represented by Expression (1) below, $$Tr=\text{function}(Vr,C) \qquad (1)$$

where Vr is a threshold voltage value, C is a capacitance of the transmission line, and Tr is a time constant that is determined in accordance with the capacitance, and control is performed such that the voltage change unit promotes output of electric power from the device to the transmission line when a state in which V0>Vr is continued for a time Tr or more, and stops the promotion of the output when V0 reaches Vr, where V0 is local observed voltage of the power converter.

6. The power converter according to claim 4, wherein the device is a power generation device.

7. The power converter according to claim 6, wherein the power generation device is one of a power generation device configured to generate electric power by using renewable energy and a power generation device configured to generate electric power by using fuel.

8. The power converter according to claim 2, wherein the reference function has a relationship as represented by Expression (1) below, $$Tr=\text{function}(Vr,C) \qquad (1)$$

where Vr is a threshold voltage value, C is a capacitance of the transmission line, and Tr is a time constant that is determined in accordance with the capacitance, and control is performed such that the voltage change unit suppresses input of electric power from the transmission line to the device when a state in which V0<Vr is continued for a time Tr or more, where V0 is local observed voltage of the power converter.

9. The power converter according to claim 2, wherein the reference function has a relationship as represented by Expression (1) below, $$Tr=\text{function}(Vr,C) \qquad (1)$$

where Vr is a threshold voltage value, C is a capacitance of the transmission line, and Tr is a time constant that is determined in accordance with the capacitance, and control is performed such that the voltage change unit promotes input of electric power from the transmission line to the device when a state in which V0>Vr is continued for a time Tr or more, and stops promotion of input if V0 reaches Vr, where V0 is local observed voltage of the power converter.

10. The power converter according to claim 8, wherein the device is a load.

11. The power converter according to claim 10, wherein the load is an electric vehicle charger for charging an in-vehicle battery that is mounted on the electric vehicle.

12. A method of controlling a power converter connected to a transmission line, the power converter including an input unit configured to be electrically connected to a device that is able to input electric power from the transmission line and/or output electric power to the transmission line, the method comprising:
- changing, by a voltage change unit connected to the input unit, voltage;
- adjusting, by a voltage adjustment unit connected to the voltage change unit, the voltage supplied to the transmission line;
- determining a first target value of the voltage change unit;
- observing the voltage of the transmission line;
- calculating a second target value of the voltage adjustment unit in accordance with the observed voltage of the transmission line; and
- generating the first target value as an output target of the voltage change unit in accordance with the observed voltage of the transmission line, wherein
- the first target value has characteristics to change a threshold voltage for controlling output of the voltage adjustment unit depending on time.

13. A non-transitory computer-readable recording medium on which a program that causes a processor to execute a method of controlling a power converter connected to a transmission line, the power converter including an input unit configured to be electrically connected to a device that is able to input electric power from the transmission line and/or output electric power to the transmission line, the program instructing the processor to execute:
- changing, by a voltage change unit connected to the input unit, voltage;
- adjusting, by a voltage adjustment unit connected to the voltage change unit, the voltage supplied to the transmission line;
- determining a first target value of the voltage change unit;
- observing the voltage of the transmission line;
- calculating a second target value of the voltage adjustment unit in accordance with the observed voltage of the transmission line; and
- generating the first target value as an output target of the voltage change unit in accordance with the observed voltage of the transmission line, wherein
- the first target value has characteristics to change a threshold voltage for controlling output of the voltage adjustment unit depending on time.

* * * * *